US008769636B1

(12) United States Patent
Nelson et al.

(10) Patent No.: US 8,769,636 B1
(45) Date of Patent: Jul. 1, 2014

(54) SYSTEMS AND METHODS FOR AUTHENTICATING WEB DISPLAYS WITH A USER-RECOGNIZABLE INDICIA

(75) Inventors: Jeffrey Nelson, Mountain View, CA (US); David Jeske, San Francisco, CA (US)

(73) Assignee: Google Inc., Mountain View, CA (US)

( * ) Notice: Subject to any disclaimer, the term of this patent is extended or adjusted under 35 U.S.C. 154(b) by 1713 days.

(21) Appl. No.: 11/677,366

(22) Filed: Feb. 21, 2007

Related U.S. Application Data

(60) Provisional application No. 60/876,578, filed on Dec. 22, 2006.

(51) Int. Cl.
*G06F 21/00* (2013.01)

(52) U.S. Cl.
USPC ............................................................ 726/5

(58) Field of Classification Search
USPC ...................................... 726/2; 713/183, 186
See application file for complete search history.

(56) References Cited

U.S. PATENT DOCUMENTS

| | | | |
|---|---|---|---|
| 4,759,063 A | 7/1988 | Chaum | |
| 4,991,210 A | 2/1991 | Chaum | |
| 6,405,192 B1 * | 6/2002 | Brown et al. | 707/722 |
| 7,359,507 B2 | 4/2008 | Kaliski | |
| 7,664,960 B1 | 2/2010 | Clubb | |
| 7,685,631 B1 * | 3/2010 | Paya et al. | 726/8 |
| 7,930,553 B2 | 4/2011 | Satarasinghe et al. | |
| 2004/0093527 A1 * | 5/2004 | Pering et al. | 713/202 |
| 2004/0230843 A1 | 11/2004 | Jansen | |

OTHER PUBLICATIONS

Real User Corporation; Strategies for using PassFaces™ for Windows; 2002; 8 pages.
Dhamija, R. et al.; "The Battle Against Phishing: Dynamic Security Skins"; Proceedings of the Symposium on Usable Privacy and Security (SOUPS); 2005; pp. 77-88.
Bank of America Corporation; "SiteKey Frequently Asked Questions"; 2007. Downloaded from http://www.bankofamerica.com/onlinebanking/index.cfm?template=site_key&state=MD on Sep. 24, 2007; 4 pages.
Ross, et. al.; "Stronger Password Authentication Using Browser Extensions; Proceedings of the 14th Usenix Security Symposium; 2005." Downloaded from http://crypto.stanford.edu/PwdHash/#publications on Oct. 25, 2007; 15 pages.

(Continued)

*Primary Examiner* — William Goodchild
(74) *Attorney, Agent, or Firm* — Sterne, Kessler, Goldstein & Fox P.L.L.C.

(57) ABSTRACT

The present invention relates to systems and methods for providing a user indicia in a display at a local client browser. The user indicia is selected prior to a web transaction and is recognizable by the user. The user indicia is displayed in a web page of a web transaction during authentication. A user can recognize the user indicia prior to providing authentication information in a web transaction. An authentication system includes a web server that provides a web page having a security box identifier, and a client browser that receives the web page from the web server. In response to the security box identifier, the client browser inserts a user indicia into the received web page and outputs a modified web page including the user indicia for display.

19 Claims, 11 Drawing Sheets

(56) References Cited

OTHER PUBLICATIONS

Halderman, et. al.; "A Convenient Method for Securely Managing Passwords"; Proceedings of the 14th international conference on World Wide Web; 2005; 471-479. Downloaded from http://www.cs.princeton.edu/~jhalderm/papers/#password on Oct. 25, 2007; 9 pages.

Nelson, et al. U.S. Appl. No. 11/677,361, filed Feb. 21, 2007, entitled "Systems and Method for Strengthening Web Credentials"; 24 pages.

* cited by examiner

At Remote Strengthening Server 520B

At Password Strengthener 520A

SYSTEMS AND METHODS FOR AUTHENTICATING WEB DISPLAYS WITH A USER-RECOGNIZABLE INDICIA

CROSS-REFERENCE TO RELATED APPLICATIONS

This application claims the benefit of U.S. Provisional Appl. No. 60/876,578, filed Dec. 22, 2006, and incorporated by reference herein in its entirety.

This application is related to a co-pending, commonly-owned patent application, "Systems and Methods for Strengthening Web Credentials," application Ser. No. 11/677,361, filed herewith, by the same inventors and incorporated in its entirety herein by reference.

FIELD OF THE INVENTION

The present invention relates to web security.

RELATED ART

The emergence and development of computer networks and protocols, including the World Wide Web (or simply "web"), has allowed many users to engage in a variety of transactions. Transactions over the web are often carried out between a browser and a web server. A user at a client device operates the browser. The browser (also called a client browser) is coupled over one or more networks, such as the Internet, to the web server. The web server in turn can be part of or coupled to another server that manages the transaction. These transactions can involve shopping, commerce, news, information, trade, registration, enrollment, entertainment, game play, or many other types of applications depending upon the entities involved. Such entities can be businesses, governments, organizations, individuals or others that wish to carry out transactions over the web with remote users.

To provide security, web transactions often require a user to input a credential, hereinafter referred to as a web credential. Such a credential can be a password associated with the user that is used to authenticate the web transaction. The password can be a number of characters (alphanumeric or other types of characters or data). While users recall passwords in terms of characters, computers carrying out a web transaction often manipulate binary representations of the credentials in bits of data. Security strength of credentials against brute force and dictionary attacks is measured in terms of bits of information entropy or Shannon entropy, hereafter referred to simply as entropy. Credentials with high entropy provide high security; they are not vulnerable to brute force or dictionary attacks. Human memorizable passwords may have low entropy, around 22 bits of entropy. Users have difficulty remembering or managing web credentials with sufficiently high entropy to be secure. Accordingly, it is desirable in many web transactions to allow users to remember low entropy web credentials, despite the security weakness.

Phishing is an expensive type of fraud that causes users to give away their passwords to illegitimate web sites. A phisher operates a rogue website that spoofs a legitimate web site. The rogue web site is often set up to look nearly identical to the legitimate web site with similar logos, graphics, text or visual appearance. The rogue website is then operated to capture a user's personal information using social engineering attacks. Phishing can be viewed as a type of man-in-the-middle attack in which the attacker is able to intercept certain communications by imitating a trusted party in a communication.

In a phishing attack, the phisher attempts to lure the victim to the rogue website. One way phishers operate is to launch a phishing campaign by spamming a large number of email messages sent to a large number of different users. Links to the rogue website are embedded in the email messages and the users are encouraged to select the link. Once a user selects the link, the user is then directed to the rogue website and may be misled into providing personal information. The phisher uses social engineering to incite the user to action, implying imminent account cancellation, credit proceedings, or even offering monetary incentives in exchange for personal information. Such personal information can include any type of information sought by the phisher, such as, credit card information, account numbers, user names, and passwords. A phisher can then try to exploit the personal information to gain access to financial accounts, impersonate a user, or cause other harm or damage.

Expensive or intrusive solutions have been proposed to defeat phishing. For instance, U.S. Published Patent Application No. 20040093527 describes a method for authenticating by recognizing a photo from a collection of photos and other random photos. The generated credential is not based on a textual password and requires substantial costs to incorporate into a web site. U.S. Published Patent Application No. 20040230843 describes a method for salting passwords with a sequence of recognizable images. Deployment, however, requires substantial costs to incorporate into a web site. The web site, PassFaces.com, offers a technology for authenticating by facial recognition; however, the generated credential is not based on a textual password and requires substantial costs to incorporate into a web site. A tool called, Dynamic Security Skins, described by Dhamija, Rachna and J. D. Tygar, "The Battle against Phishing: Dynamic Security Skins," ACM International Conference Proceedings Series, Proceedings of the 2005 Symposium on Usable Privacy and Security, 93: 77-88 (2005), presents users with a recognizable image and utilizes a cryptographic protocol (SRP) to transfer the password to the server. However, the authentication box is not integrated directly into a web page, increasing the cost of deployment. Finally, a tool called, SiteKey, presents users with a recognizable image during sign in. The image is specified by a user agent cookie which causes the recognizable images to periodically reset increasing the burden on users to recognize the images. The user agent cookie also can be intrusive and limits operation to transactions with a single web site.

What is needed is a relatively low cost solution for web sites to authenticate users that is reasonably secure against phishing and identity theft and operable in web transactions across one or more web sites.

SUMMARY OF THE INVENTION

The present invention relates to systems and methods for providing a user indicia in a display in a web transaction. The user indicia is selected prior to a web transaction and is recognizable by the user. The user indicia is displayed in a web page of a web transaction during authentication. In this way, a user can recognize the user indicia prior to providing authentication information in a web transaction.

In an embodiment, an authentication system provides a personalized user recognizable indicia in displays at a local client browser. The system includes a web server that provides a web page having a security box identifier. A user indicia generator receives the web page from the web server. In response to the security box identifier, the user indicia generator inserts a user indicia into the received web page and outputs a modified web page including the user indicia for display.

In another embodiment, a user indicia generator provides a user indicia in web pages served by multiple independent web sites. The user indicia generator receives web pages having a security box identifier from multiple web servers, and in response to the security box identifier, inserts a user indicia into the received web pages, and outputs modified web pages including the user indicia for display in different web transactions.

In another embodiment, a method includes receiving a web page having a security box identifier, inserting a user indicia into the received web page in response to the received security box identifier, and displaying a modified web page including the user indicia. A user of the client browser can then recognize the user indicia in the display when interacting with the displayed modified web page.

According to one feature, web spoofing is prevented by showing a personalized user experience compatible across multiple web sites.

In another embodiment, a user indicia generator and credential strengthener are used in combination to secure web transactions. A system for securing web-based transactions includes a client browser that communicates with a web server in a web-transaction, and a credential strengthener. The client browser includes a user indicia generator that receives a web page having a security box identifier, and in response to the security box identifier, inserts a user indicia into the received web page, and outputs a modified web page including the user indicia for display. The credential strengthener converts a web credential entered by a user at the client browser to a higher entropy web credential associated with the user, and the client browser returns the higher entropy web credential to the web server. In this way, a low cost solution for web sites to authenticate and secure against phishing and identity theft is provided.

Further embodiments, features, and advantages of the invention, as well as the structure and operation of the various embodiments of the invention are described in detail below with reference to accompanying drawings.

BRIEF DESCRIPTION OF THE FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION OF EMBODIMENTS

The present invention relates to systems and methods for providing a user indicia in a display at a local client browser prior to authentication of a user in a web transaction. The user indicia can be known to the user so that it can be recognized by the user in a web transaction before a user enters authentication credentials, such as, a password.

Figure 1:
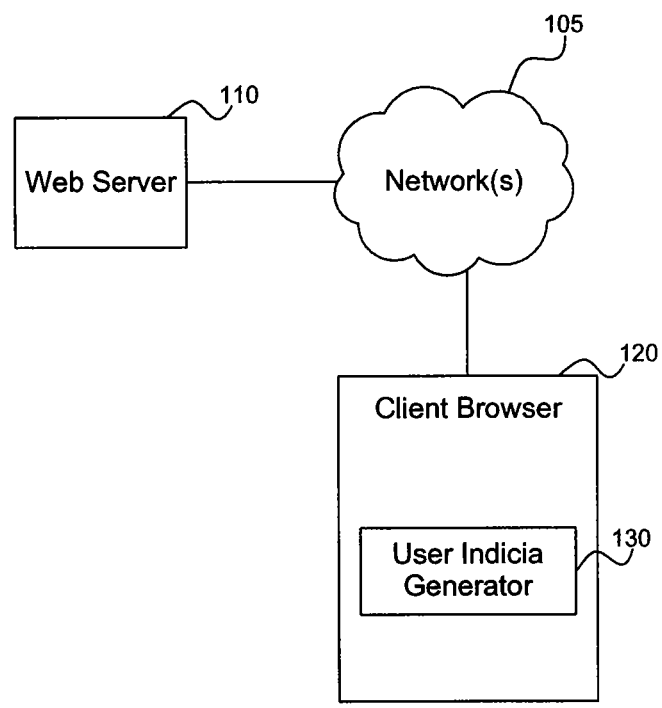
FIG. 1 is a diagram of a system for authenticating users over a network with a user indicia generator according to an embodiment of the present invention.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.
Authentication with User Recognizable Indicia FIG. 1 shows a system 100 for authenticating users according to an embodiment of the present invention. System 100 includes a web server 110 coupled to a client browser 120 over one or more networks 105. According to a feature, client browser 120 includes user indicia generator 130. Network(s) 105 can be any network or combination of networks that can carry data communication between web server 110 and client browser 120. Such network(s) 105 can include, but are not limited to, a local area network, medium area network, and/or wide area network such as the Internet. Network(s) 105 can support protocols and technology including, but not limited to, World Wide Web protocols and/or services.

Client browser 120 and user indicia generator 130 can be implemented in software, firmware, hardware, or any combination thereof. Client browser 120 and user indicia generator 130 can be implemented to run on any type of processing device including, but not limited to, a computer, workstation, distributed computing system, embedded system, stand-alone electronic device, networked device, mobile device, set-top box, television, or other type of processor or computer system. Client browser 120 and user indicia generator 130 can also be used in a variety of applications. Client browser 120 and user indicia generator 130 can be used in connection with a search engine, web portal, or other web site to allow remote users to engage in web transactions. Likewise, web server 110 can operate alone or in tandem with other servers, web servers, or devices and can be part of any search engine, portal, or web site. In alternative arrangements, user indicia generator 130 can be part of or separate from client browser 120.

In operation, web server 110 provides a web page having a security box identifier. For example, a security box identifier may be an identifier inserted in hypertext mark-up language (HTML) in a web page. The web page with the security identifier is then sent over network 105 to client browser 120 as part of a web transaction. Client browser 120 receives the web page from web server 110. User indicia generator 130 then identifies the presence of the security box identifier and generates a user indicia corresponding to the user at the browser. For example, user indicia generator 130 may access a user indicia previously selected by a user for use as a recognizable indicia when authenticating web transactions. Such predetermined user indicia may be stored locally in a memory at client browser 120 or remotely at other locations.

User indicia generator 130 then inserts the user indicia into the received web page and outputs a modified web page which includes the user indicia. The modified web page is then output for display by client browser 120. Since the modified web page includes the user indicia, a user can recognize the user indicia and gain trust in the web transaction prior to entering authentication information, such as, a user id, password, or other web credential.

Figure 2A:
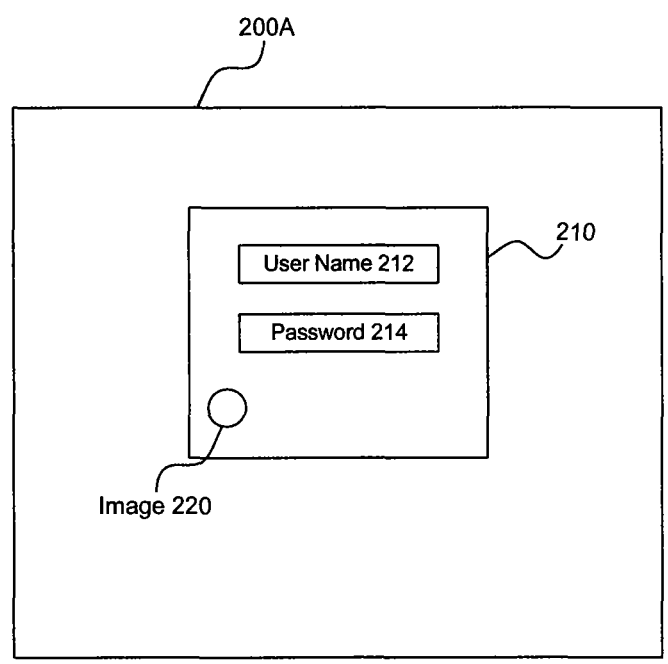
FIG. 2A is a diagram of an example display having a personalized user recognizable indicia displayed during authentication according to an embodiment of the present invention.

FIG. 2A is a diagram of an example display 200A that can be during authentication according to an embodiment of the present invention. Display 200A can include an authentication panel 210 and a user recognizable indicia 220. Authentication panel 210 includes a field 212 for entering user name information (such as a user id) and a field 214 for entering a password. Such authentication panels are used in a variety of web transactions by a variety of web sites. This example panel 210 and the authentication information in fields 212, 214 are illustrative and not intended to limit the present invention. Other types of authentication input and types of authentication information can be used as would be apparent to a person skilled in the art given this description.

User recognizable indicia 220 is displayed at or near authentication fields 212, 214. In this way, a user can recognize indicia 220 prior to entering authentication information in a web transaction.

Figure 2B:
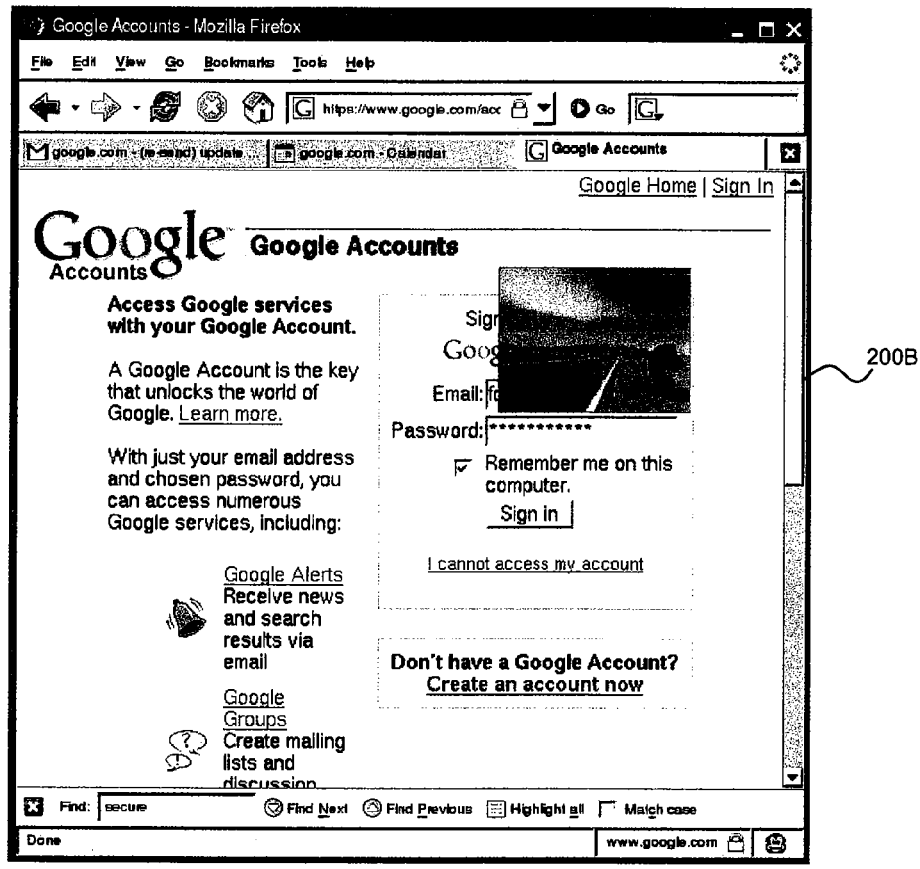
FIG. 2B is a screen shot of an example display having a personalized user recognizable indicia displayed during authentication according to an embodiment of the present invention.

To illustrate this even further, FIG. 2B shows a screen shot of an example display 200B having a personalized, user recognizable indicia displayed during authentication, according to an embodiment of the present invention. As shown in display 200B, a user indicia made up of a photograph of a user's motorcycle parked on a highway is displayed to temporarily overlay an authentication panel. The authentication panel has fields requesting a user to enter email address and password information to carry out a web transaction. Because the user indicia is present, a user can recognize the photograph and then proceed with a measure of trust to input the authentication information requested in the panel fields. In a further feature, a user may have to move or select the user indicia to expose fields in the authentication panel making it even more likely that the user will recognize the user indicia before entering authentication information.

In one example, the user indicia (such as an image) may be known only to the user. The image is stored locally. The image may be encrypted or have protected access privileges. Phishing attackers cannot imitate the user indicia, since its selection is a secret known to the user. As a result, a phishing attacker cannot effectively imitate the password prompt. A user can learn to provide a web credential (such as a password) only when the user indicia is present. Across different web transactions, a recognizable customization, such as a secret image, may then be shown to the user as proof of a legitimate password prompt.

While the functionality of user indicia generator 130 and client browser 120 are described as separate modules, the present invention is not so limited and their functionality can be combined in one module or distributed in more than one module across one or more devices. In one implementation, user indicia generator 130 can be a security extension to client browser 120.

Also, user indicia generator 130 may be part of operating system, a web browser, a browser extension, or other client software on a network device. User indicia generator 130 may be implemented using a number of client side technologies including, but not limited to, HTML, JavaScript, ActiveX, or Flash. The recognizable user indicia may be shared across many sites.

The user indicia provided to the user may include one or more of the following images, custom text, browser customization, window customization, desktop customization, user interface skins, music or audio content, voice recordings, visual hash images, or animation.

The user indicia may be remotely served across a network, such as embedded into a web page, instead of stored locally.

Figure 3:
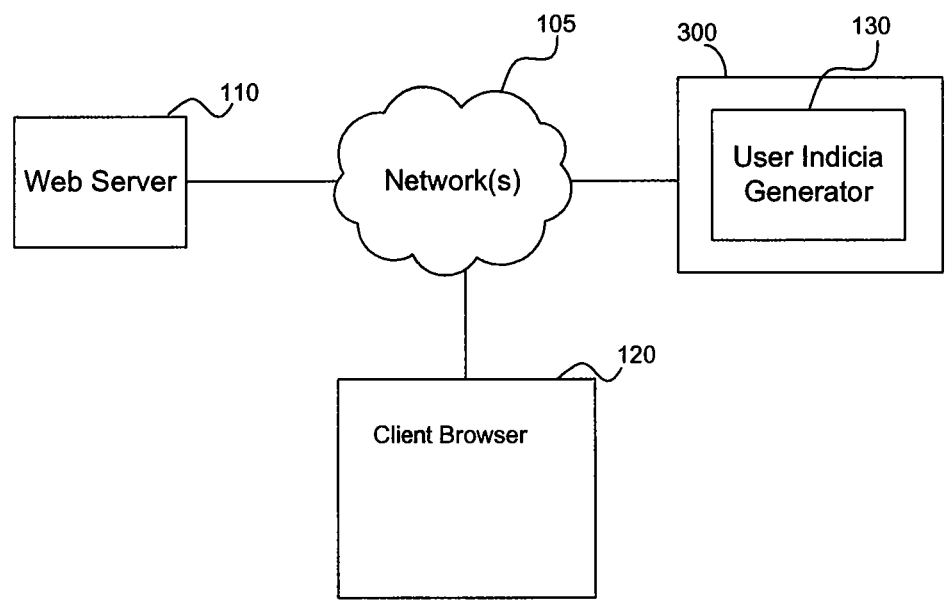
FIG. 3 is a diagram of a system for authenticating users over a network with a user indicia generator at a remote server according to another embodiment of the present invention.

In another embodiment, shown in FIG. 3, a system for authenticating users over a network 105 can be configured to have a user indicia generator 130 at a remote server 300 according to another embodiment of the present invention. User indicia generator 130 operates as described above to access a user indicia and output it to client browser 120 for display in authenticating a web transaction. Such a remote server 300 may then be able to set up to manage and handle a number of user indicia, and requests therefor.

Figure 4:
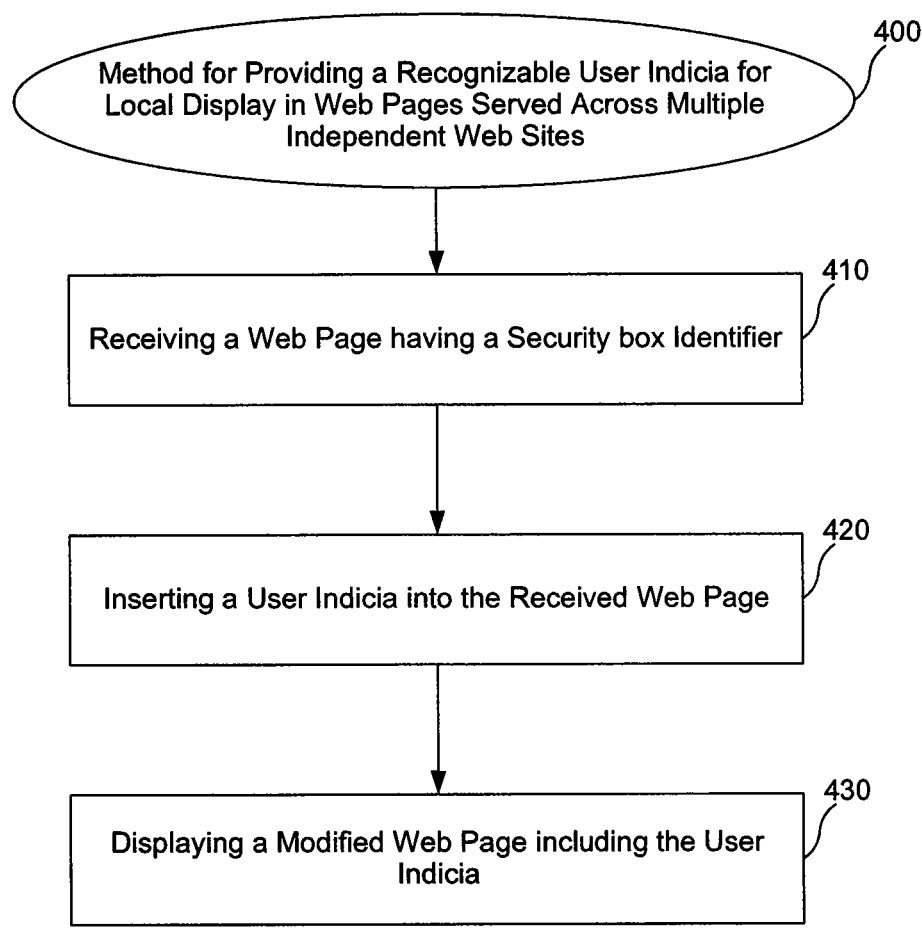
FIG. 4 is a diagram that shows a routine for providing a personalized user recognizable indicia for local display during authentication in a web transaction according to another embodiment of the present invention.

FIG. 4 is a diagram that shows a routine 400 for providing a personalized, user recognizable indicia for local display during authentication in a web transaction according to another embodiment of the present invention (steps 410-430). Method 400 is described with respect to structure of system 100 for brevity, but this is not intended to limit method 400 as other structure may be used as would be apparent to a person in the art given this description. In step 410, a web page having a security box identifier is received at a client browser 120 coupled to a user indicia generator 130. User indicia generator 130 then inserts a user indicia into the received web page in response to the received security box identifier (step 420). A modified web page including the user indicia is displayed (step 430). In this way, a user of client browser 120 can recognize the user indicia in the display when interacting with the displayed modified web page. These steps can be carried out in web transactions with one or more web sites. In each transaction the user can recognize the same user indicia and continue with a measure of trust with the web transaction.

In the embodiments above, not only does a user proceed with an additional measure of trust in the web transaction by recognizing the user indicia but a further advantage is realized in that many phishing attacks would be thwarted. Many phishing attacks mimic web page displays used in a web transaction. These displays often mimic the authentication panels in style and appearance to deceive users. However, a phishing web page would not likely include a security box identifier or have knowledge of the user indicia selected by the user. Accordingly, one feature of these embodiments is that a client browser in a phishing attack would not likely be able to access and display a user indicia recognizable to the user. This would help a user to avoid inputting authentication information to a phisher that did not have the security box identifier in its web page. This may reduce or ameliorate much of the harm from identity theft and fraud that arises from phishing.

In this way, a low cost solution for web sites to authenticate and secure against phishing and identity theft is provided.

Authentication with User Recognizable Indicia and Web Credential Strengthening

According to a further feature, web credential strengthening can be added in combination with user recognizable indicia to further improve security. In this way, a low cost solution for web sites to authenticate and further secure against phishing and identity theft is provided.

Figure 5:
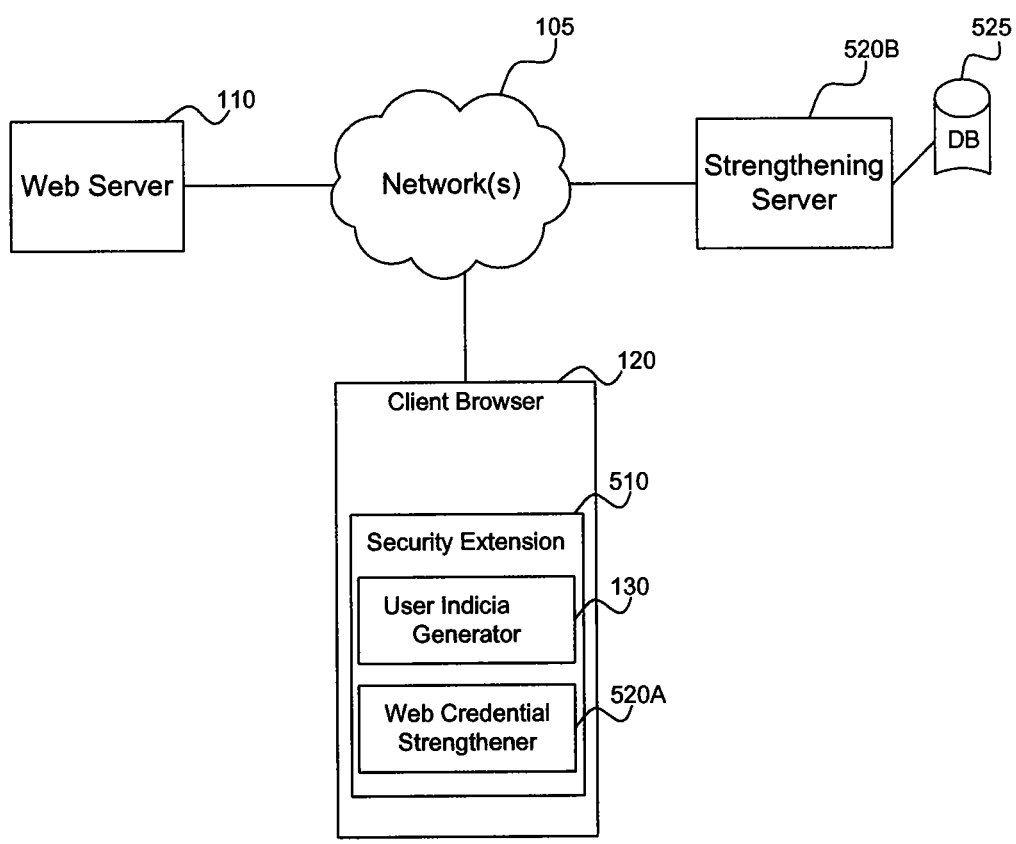
FIG. 5 is a diagram of a system for authenticating users over a network with a user indicia generator with web credential strengthening according to a further embodiment of the present invention.

FIG. 5 is a diagram of a system 500 for authenticating users according to a further embodiment of the present invention.

System 500 includes a web server 110 coupled to a client browser 120 over one or more networks 105. A credential strengthener 520 includes a web-credential strengthener 520A and one or more remote strengthening servers 520B. One or more databases 525 can be coupled to strengthening server 520B.

In one example as shown in FIG. 5, user indicia generator 130 and web credential strengthener 520A are provided as part of a client browser 120. In particular, user indicia generator 130 and web credential strengthener 520A can be a security extension for client browser 120. Strengthening server 520B is provided in a remote location and coupled to client browser 120 and web credential strengthener 520A over network(s) 105. Strengthener server 520B can also communicate with and pass data to and from one or more databases 525. Database 525 can be locally or remotely coupled to strengthener server 520B.

In operation, client browser 120 communicates with web server 110 over network 105 to carry out a web transaction. Web server 110 serves data necessary to complete a web transaction to client browser 120. Client browser 120 in turn provides data necessary to complete the web transaction to web server 110. As is well known, a variety of transactions may be carried out over the web. These transactions can involve shopping, commerce, news, information, trade, registration, enrollment, entertainment, game play, or many other types of applications depending upon the entities involved. Such entities can be businesses, governments, organizations, individuals or others that wish to carry out transactions over the web with remote users. Web server 110 in turn can be coupled to other servers (not shown) to support different web transactions. The term "web transaction" as used herein is meant to be inclusive and not limiting, and can be any transaction carried out over computer network(s) using web-related technology or protocols known now or developed in the future.

Many web transactions require a user to input a credential at client browser 120. As described above with respect to FIGS. 1-4, web server 110 can provide a web page with a security box identifier to client browser 120. User indicia generator 130 accesses a user indicia and client browser 120 displays a modified web page that includes the user indicia as described above.

In general, security is improved if a credential is entered which has a high entropy. A high entropy credential, for example, may be a credential having a large number of bits in its binary representation including, but not limited to, a number of bits that equals or exceeds 128 bits. Users, however, may have difficulty remembering or managing high entropy credentials. Accordingly, many users use credentials that are of low entropy. Such a low entropy credential may be a 4-12 character password represented by a small number bits of entropy, approximately 20-24 bits, less than the 128 bits needed for a high level of security. Accordingly, one problem in many of conventional web-transactions as described above is the use of low entropy credentials being passed between client browser 120 and web server 110 to carry out web-based transactions.

According to a further feature, after the user indicia is displayed and the user proceeds to input a web credential, credential strengthener 520 (including web credential strengthener 520A and strengthening server 5208) operate to convert a web credential entered by a user at client browser 120 to a higher entropy web credential associated with the user. Client browser 120 then automatically returns the higher entropy web credential to web server 110. In this way, web transactions are supported with higher entropy web credentials yet users need only to remember or manage low entropy credentials. According to a feature, a cryptographically secure, higher entropy web credential is returned. In this way, even a phisher managed to use a correct security box identifier or otherwise fool a user to enter a web credential, at most, the phisher would only receive a higher entropy web credential unusable by the phisher.

Client browser 120 (including its component modules such as user indicia 130 generator and/or web credential strengthener 520A) can be implemented in software, firmware, hardware, or any combination thereof. Client browser 120 can be implemented to run on any type of processing device including, but not limited to, a computer, workstation, distributed computing system, embedded system, stand-alone electronic device, networked device, mobile device, set-top box, television, or other type of processor or computer system. Client browser 120 can also be used in a variety of applications. Client browser 120 can be used in connection with a search engine, web portal, or other web site to allow remote users to engage in web transactions. Likewise, web server 110 can operate alone or in tandem with other servers, web servers, or devices and can be part of any search engine, portal, or web site.

Figure 6:
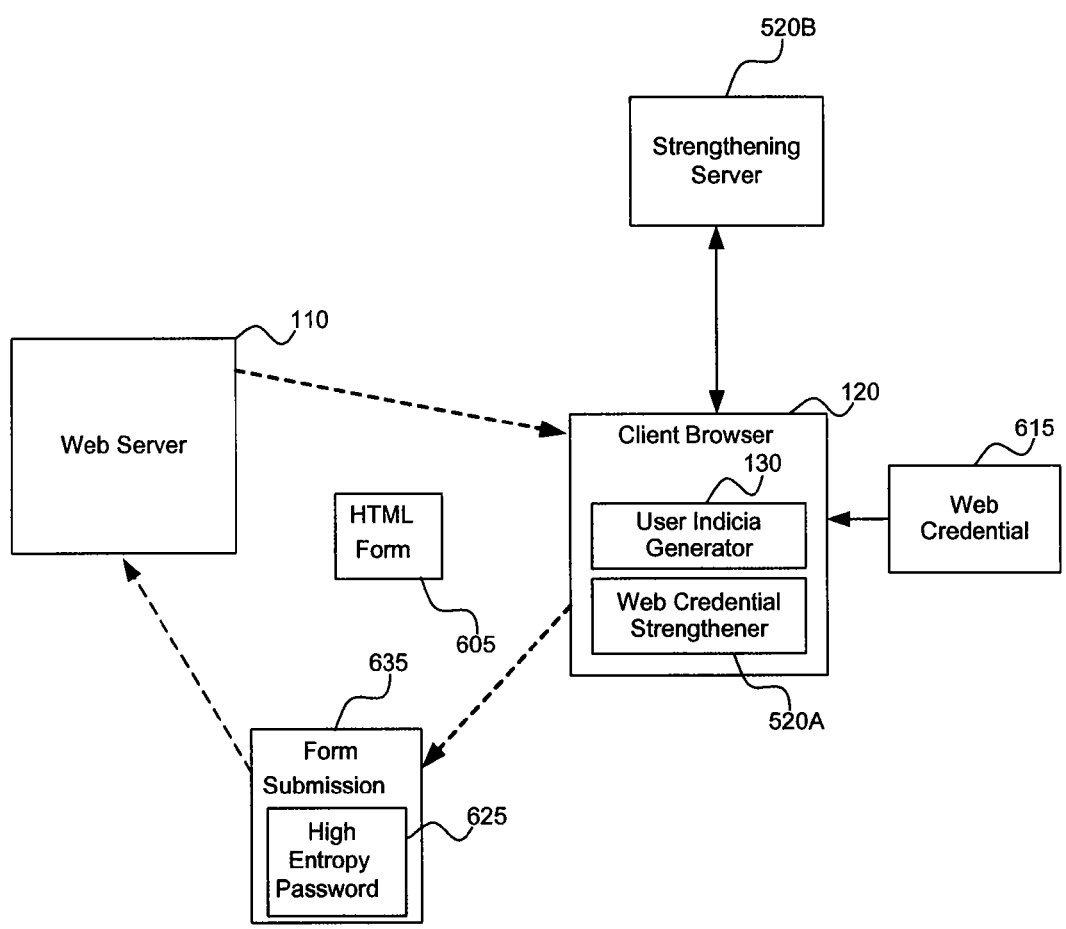
FIG. 6 is a diagram that shows example information passed to and from a client browser in the system of FIG. 5.

FIG. 6 shows the operation of system 500 in an example web transaction. When the web transaction is initiated web server 110 sends a form (or series of forms or pages), such as, a form 605 in a hypertext mark-up language (HTML) to client browser 120. Form 605 may include a security box identifier. User indicia generator 130 accesses a user indicia and client browser 120 displays a modified web page that includes the user indicia as described above.

HTML form 605 may also include a request for a credential from a user. For example, HTML form 605 may include a field or box with text indicating to the user that he or she should enter a web credential, such as, a password. A user can recognizes the user indicia and then proceed to enter web credential 615 associated with the particular transaction.

Credential strengthener 520 made up of web credential strengthener 520A and remote strengthening server 520B, then converts web credential 615 from a relatively low entropy to a higher entropy web credential 625 according to a cryptographically strong algorithm. For example, a low entropy password input by user made up of a relatively few characters corresponding to a relatively small number of bits can be converted to a high entropy password represented by a larger number of bits. Then client browser 120 prepares a form submission 635 for return to web server 110. Credential strengthener 520 inserts high entropy web credential 625 in form submission 635. In this way, the high entropy password 625 can be automatically returned as part of form submission 635 to web server 110 to continue the web transaction.

Credential strengthener 520 carries out a secret strengthening protocol to convert low entropy credentials to cryptographically secure, higher entropy credentials. Such a secret strengthening protocol can be implemented with a cryptographic algorithm including, but not limited to, the following algorithms: a RSA cryptographic algorithm, a quadratic residue cryptographic algorithm, an elliptical curve cryptographic algorithm, a Ford-Kaliski cryptographic algorithm, a Chaum blind signature cryptographic algorithm, or other homomorphic encryption algorithm.

In one embodiment, a Chaum blind signature cryptographic algorithm is used and carried out jointly by web credential strengthener 520A and strengthening server 520B.

The operation of an example credential strengthener 520 is described in further detail below with respect to FIGS. 7-9B.

Figure 7:
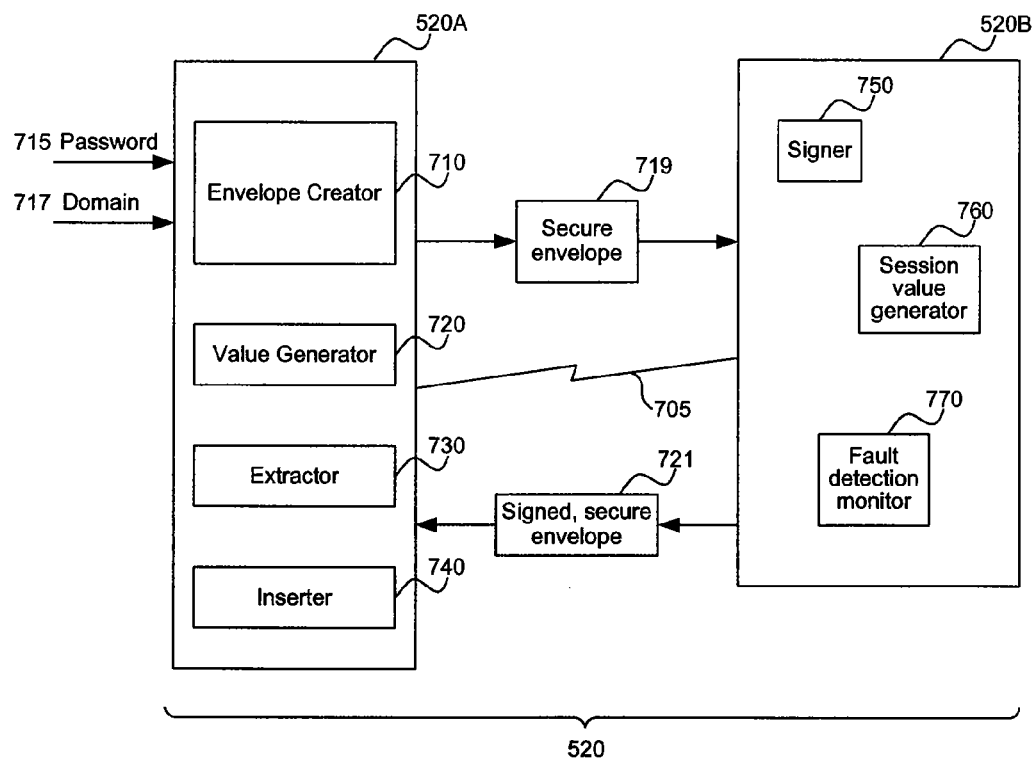
FIG. 7 is a diagram that shows components of a credential strengthener according to an embodiment of the present invention.

FIG. 7 shows an example credential strengthener 520 according to an embodiment of the present invention. In one example, credential strengthener 520 carries out a Chaum blind signature cryptographic algorithm to strengthen a web credential. In this example, web credential strengthener 520A includes an envelope creator 710, value generator 720, extractor 730, and an inserter 740. Remote strengthening server 520B includes a signer 750 and session value generator 760.

An optional fraud detection monitor 770 can also be provided at remote strengthening server 520B. Fraud detection monitor 770 can be used to monitor requests to the secret strengthening provider 520B in order to detect an attacker. Where a fraud detection monitor 770 is used, preventative measures may be made available to block anyone submitting a large number of failed authentication attempts. Preventative measures to prevent attacks may also include blocking account access, blocking IP access, rate limiting, serving CAPTCHA requests, or flagging suspicious traffic for additional audit reviews.

For brevity, the operation of credential strengthener 520 will be described with respect to the method 800 set out in FIGS. 8, 9A, and 9B. Method 800, however, is not necessarily limited to the structure of system 100 and credential strengthener 520.

Figure 8:
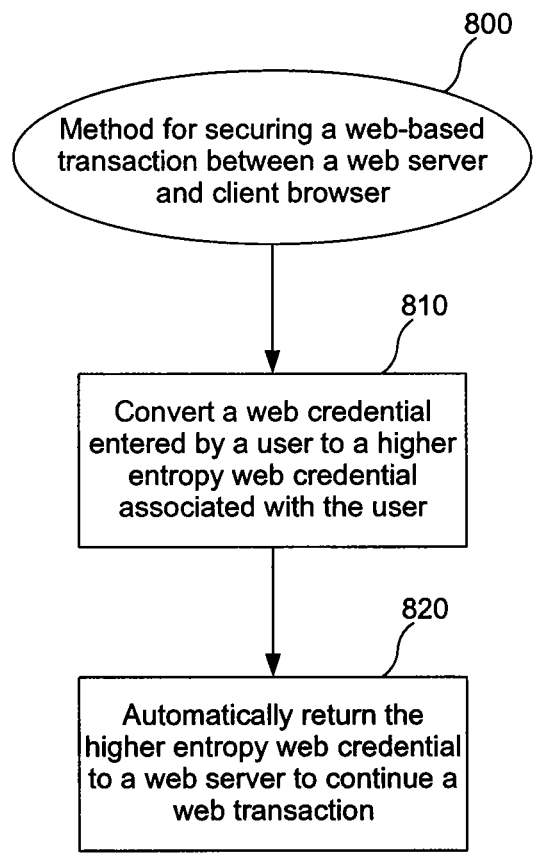
FIG. 8 is a diagram of a method for securing a web-based transaction according to an embodiment of the present invention.
Figure 9A:
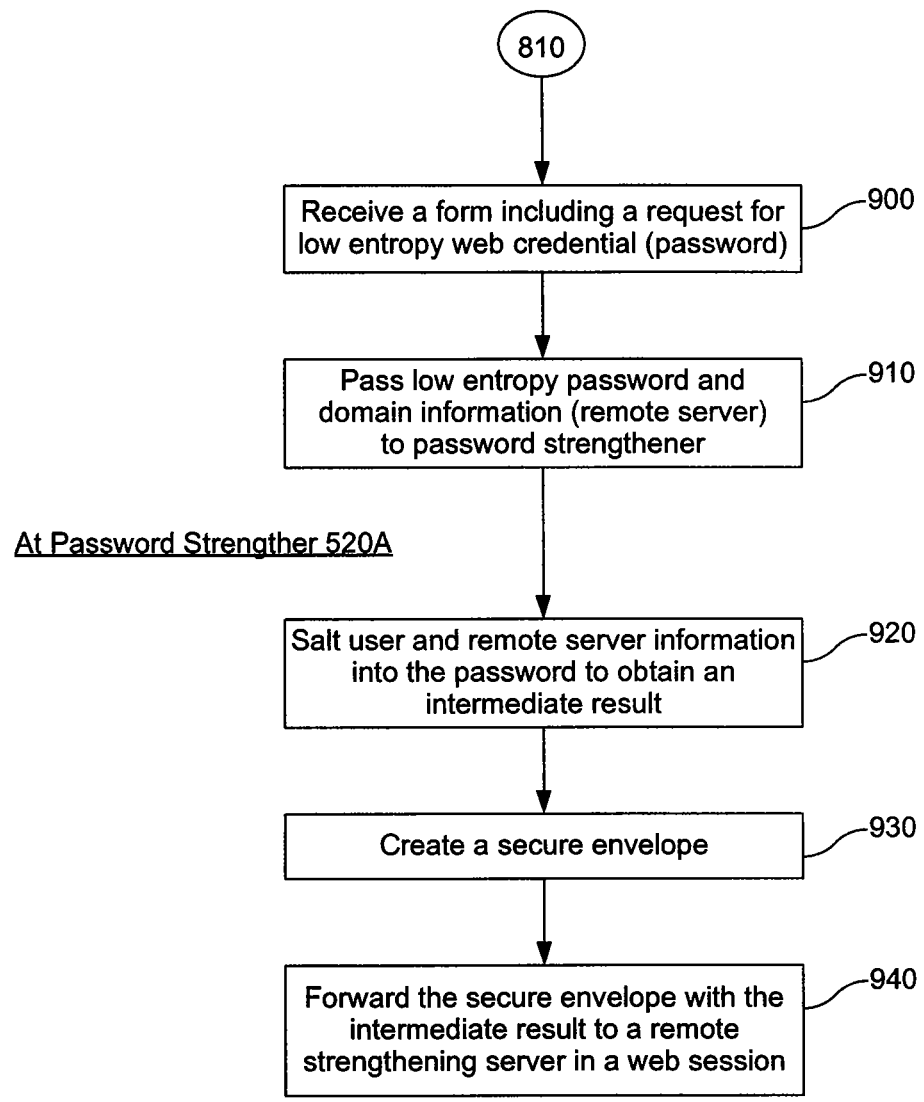
FIGS. 9A and 9B are flow charts that illustrate conversion of a web credential in further detail.
Figure 9B:
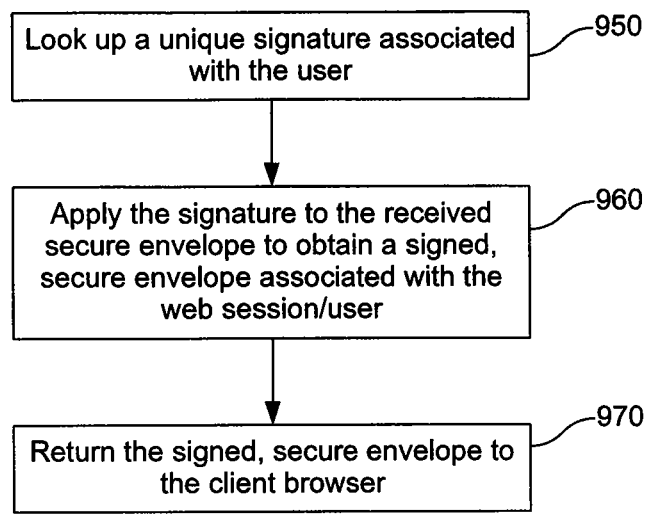
Figure 9B:
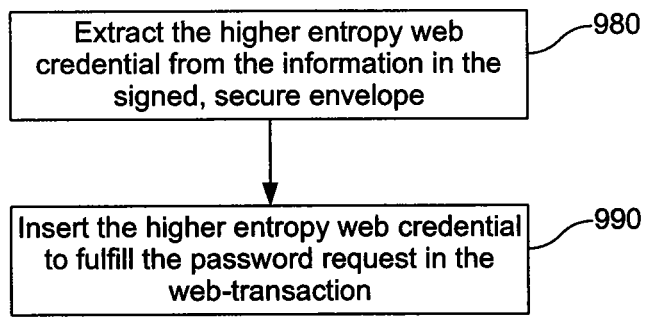

As shown in FIG. 8, a method 800 for securing a web-based transaction between a web server 110 and client browser 120 is provided (steps 810-820). In step 810, a web credential entered by user is converted to a higher entropy web credential associated with the user. In step 820, the higher entropy web credential is returned to web server 110 to continue the web-transaction. The higher entropy web credential can be automatically returned without involvement by the user. Alternatively, the higher entropy web credential can be returned semi-automatically or manually with more involvement by the user in the process depending upon a particular application or need.

The operation of step 810 is described in further detail below with respect to FIGS. 9A and 9B and the example credential strengthener 520 in FIG. 7. As shown in FIGS. 9A and 9B, conversion of the web credential requires different functions to be carried out between web credential strengthener 520A and remote strengthening server 520B. As shown in FIG. 9A at web credential strengthener 520A, client browser 120 receives a form 605 that includes a request for a low entropy web credential (step 900). Any type of web credential can be used depending upon the web transaction. Examples include, but are not limited to a password, PIN, identifying secret, token, or other user identifying information. The identifying information for the user can be some combination of username, full name, social security number, credit card number, drivers license number, and/or mailing address.

For clarity, the remainder of this operation is described with respect to the example where the web credential is a password. For instance, this request received by client browser 120 in step 900 can be a text box or field for inputting a password 715. For the case where web credentials other than passwords are used, such credentials may be represented as a binary sequence of bits and encoded into a text string, which can then be treated as a password.

Client browser 120 also receives information that identifies the domain of web server 110. Such domain information 717 can include, but is not limited to, all or part of a URL address of the web server 110 (or another server or identifier associated with the web transaction). For example, if the web server 110, is a web site with a host name, www.google.com, then the domain name is "google.com". The domain information for the remote server can be some combination of host name, domain name, IP, TLS session information, or SSL certificate meta data. The received low entropy password 715 and the domain information 717 is then passed to web credential strengthener 520A (also called password strengthener 520A for this example involving a password but works similarly for other types of web credentials) (step 910).

Password strengthener 520A salts user information and domain information 717 into the password 715 to obtain an intermediate result (step 920). For example, value generator 720 creates a session value K which is salted with password 715 and domain information 717 to obtain the intermediate result. In one implementation, information identifying the user and the remote server are salted into the password through the use of SHA-1 message digest algorithm. Other message digest algorithms can be used for password salting, such as MD2, MD4, MD5, SHA-2, RIPEMD, ADLER, TIGER, PANAMA, CRC, or other message digests. By salting the identifying information, such as domain name and user name, into the password to derive an intermediate value, the intermediate value can not be re-used to authenticate to different web sites or across different user names. Envelope creator 710 creates a secure envelope 719 (step 930) using a cryptographic algorithm.

In step 940, password strengthener 520A sends or forwards secure envelope 719 with the intermediate result to remote strengthening server 520B in a session over communications link 705. Link 705 can be any type of network link, including but not limited to, wired and/or wireless links over network 105.

Steps 950-970 are carried out at remote strengthening server 520B. A unique signature associated with the user is looked up (step 950). For example, session value generator 760 generates a unique session value associated with the session in which secure envelope 719 has been received. User information is also identified from secure envelope 719. Remote strengthening server 520B then looks up (or generates) a higher entropy credential associated with the session value and user information. In one example such a higher entropy credential associated with the session value and user information includes at least 128 bits in a binary representation.

In step 960, signer 750 applies a digital signature to the secure envelope 719 to obtain a signed, secure envelope 721 associated with the session and user. The electronic signature provided is a signature corresponding to the user. The higher entropy credential looked up is also added to the envelope 719 prior to signature. Remote strengthening server 520B returns the signed, secure envelope 721 to client browser 120 and in particular to password strengthener 520A (step 970). The signature is illustrative and not intended to necessarily limit the present invention. Other types of digital signature or encryption can be used.

In another example, a secret strengthening protocol managed by a third party strengthening provider (or consortium of providers) operates one or more strengthening servers 520B, provided to generate the signed, secure envelope 721. This third party strengthening provider could be remotely coupled to web credential strengthener 520A over network 105 and could act as a service that provides secret strengthening. The resulting cryptographically strong secret generated by the third party strengthening provider can then be incorporated into web credential 615 and web server 110. In this way, reliability and trust of strengthening server 520B can be distributed across one provider (or a consortium of providers) to enhance the security of web credential 615.

Steps 980 and 990 are carried out at password strengthener 520A. In step 980, extractor 730 extracts the higher entropy web credential from the information in the received signed, secure envelope 721. Inserter 740 inserts or makes available the higher entropy web credential 625 to fulfill the password request in the web-transaction (step 990). Control then passes to step 820 as described above.

For further description of such web credential strengthening, see, for example, U.S. Provisional Appl. No. 60/876,578, filed Dec. 22, 2006, and incorporated by reference herein in its entirety, and the co-pending, commonly-owned patent application, "Systems and Methods for Strengthening Web Credentials" application Ser. No. 11/677,361, filed herewith, by the same inventors and incorporated in its entirety herein by reference.

Further Examples and Features

In another embodiment, credential strengthener 520 need not include a remote strengthening server 520B. Instead, the web credential after salting is validated using a zero knowledge proof instead of transfer to the remote server 520B.

In another example, the resulting cryptographically strong credential is used as a key to perform other cryptography tasks. Such cryptography tasks may include but may not be limited to deriving additional cryptographic keys, one time pads, time based pads, encrypting messages, digitally signing messages, email encryption, AJAX encryption, JavaScript encryption, HTTPS session encryption, TLS session encryption, storing encrypted data, unlocking remote data stores, encrypting or signing financial transactions, electronic voting, or other applications of encryption.

Example Implementations

Client browser 120 can be run any computing or processing device that supports a browser. Any type of browser may be used including, but not limited to, Internet Explorer available from Microsoft Corp., Safari available from Apple Corp., Firefox, Opera, or other type of proprietary or open source browser. Example client devices, include, but are not limited to, any type of processing device including, but not limited to, a computer, workstation, distributed computing system, embedded system, stand-alone electronic device, networked device, mobile device, set-top box, television, or other type of processor or computer system.

Credential strengthener 520, including web credential strengthener 520A and remote strengthener 520B, can be implemented in software, firmware, hardware, or any combination thereof. Depending upon the particular implementation, credential strengthener 520 and its components can be implemented on the same or different devices and can be made to operate with a variety of applications.

CONCLUSION

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

What is claimed is:

1. An authentication system for providing a user indicia in displays at a local client browser in web pages served from across one or more web sites in different web transactions, comprising:

a web server that provides a web page having a security box identifier; and a user indicia generator, implemented by the local client browser, configured to:

identify the presence of a security box identifier in the web page, insert a user indicia, the user indicia independent of the one or more web sites, into the received web page when the security box identifier is identified, and output a modified web page including the user indicia for display prior to entry of a user ID, whereby a user of the client browser can recognize the user indicia when viewing the displayed modified web page prior to providing authentication information in a web transaction.

2. The system of claim 1, wherein the user indicia is identified secretly by a user independent of the one or more web sites.

3. The system of claim 1, wherein the user indicia includes one or more of the following user recognizable customizations: an image, text, browser customization, window customization, desktop customization, user interface skin, music or audio content, voice data, visual hash image, or animation.

4. The system of claim 1, wherein the web page includes an authentication panel for entry of authentication information.

5. The system of claim 4, wherein the authentication information includes a user ID and password associated with a user at the client browser participating in the web transaction.

6. The system of claim 5, wherein the user indicia is displayed to temporarily overlay at least a portion of the authentication panel, whereby a user prior to entry of authentication information is more likely to view the user indicia.

7. The system of claim 5, wherein the user indicia overlays at least a portion of the authentication panel until a user moves the user indicia to enter authentication information requested in the web transaction in the authentication panel.

8. The system of claim 1, further comprising a memory coupled to the user indicia generator, wherein the user indicia comprises a personalized user recognizable indicia selected by a user prior to a web transaction and stored in the memory for access by the user indicia generator.

9. The system of claim 1, wherein the user indicia is a personalized user recognizable indicia selected by a user prior to a web transaction, and the user indicia generator is coupled over a network to a client browser, and outputs the personalized user recognizable indicia to the client browser for display.

10. The system of claim 1, further comprising:

a credential strengthener coupled to the client browser;

wherein the credential strengthener converts a web credential entered by a user at the client browser to a higher entropy web credential associated with the user, and the client browser returns the higher entropy web credential to the web server.

11. The system of claim 10, wherein the credential strengthener converts the web credential entered by a user at the client browser to a cryptographically secure, higher entropy web credential associated with the user using a cryptographically secure algorithm.

12. The system of claim 10, wherein the credential strengthener includes a web credential strengthener at the client browser and a remote strengthening server coupled to the web credential strengthener over a network.

13. The system of claim 12, wherein the web credential strengthener salts user and remote server information into the password to obtain an intermediate result, creates a secure envelope, and forwards the secure envelope with the intermediate result to the remote strengthening server in a web session.

14. The system of claim 10, wherein the web credential comprises a password or a sequence of bits.

15. The system of claim 10, wherein the client browser automatically returns the higher entropy web credential to the remote web site.

16. A client browser for providing a user indicia in web pages served by multiple independent web sites, comprising:
 a user indicia generator, implemented by the client browser on a processing device, configured to:
  receive web pages having a security box identifier from multiple web servers,
  identify the presence of a security box identifier in the received web pages,
  insert a user indicia into the received web pages prior to entry of a user ID when the security identifier box is identified, and
  output modified web pages including for display, wherein the user indicia is independent of the one or more web sites and whereby a user of the client browser can recognize the user indicia in the display when interacting with the displayed modified web pages in different sessions across the multiple web sites.

17. A method for providing a user indicia for display on client browsers in web pages served across one or more independent web sites, comprising the steps of:
 receiving a web page having a security box identifier at a client browser;
 identifying, at the client browser the presence of a security box identifier in the received web page;
 inserting, at the client browser, a user indicia into the received web page when the security box identifier is identified, wherein the user indicia is independent of the one or more independent web sites; and
 displaying a modified web page including the user indicia prior to entry of a user ID, whereby a user of a client browser can recognize the user indicia in the display when interacting with the displayed modified web page in a web transaction.

18. The method of claim 17, wherein the displaying includes temporarily overlaying the user indicia on at least a portion of an authentication panel for entry of the user ID and a password, whereby a user prior to entry of authentication information is more likely to view the user indicia.

19. The method of claim 18, wherein the temporarily overlaying step overlays the user indicia on at least a portion of an authentication panel until a user moves the user indicia to enter authentication information requested in the web transaction in the authentication panel.

* * * * *